United States Patent
Foerg et al.

(10) Patent No.: US 9,162,093 B2
(45) Date of Patent: Oct. 20, 2015

(54) HOLDER FOR A FIRE PROTECTION SLEEVE

(75) Inventors: Christian Foerg, Lamerdingen (DE); Markus Kogler, Kaufering (DE)

(73) Assignee: HILTI AKTIENGESELLSCHAFT, Liechtenstein (*) Notice: Subject to any disclaimer, the term of this patent is extended or adjusted under 35 U.S.C. 154(b) by 0 days.

(21) Appl. No.: 13/431,580

(22) Filed: Mar. 27, 2012

(65) Prior Publication Data

US 2012/0280099 A1 Nov. 8, 2012

(30) Foreign Application Priority Data

Mar. 28, 2011 (DE) .................. 10 2011 006 201

(51) Int. Cl.
- *E04C 2/00* (2006.01)
- *A62C 2/06* (2006.01)
- *F16L 5/04* (2006.01)
- *H02G 3/04* (2006.01)

(52) U.S. Cl.
CPC . *A62C 2/065* (2013.01); *F16L 5/04* (2013.01); *H02G 3/0412* (2013.01)

(58) Field of Classification Search
USPC .................. 52/232, 220.8; 248/217.3, 216.4
See application file for complete search history.

(56) References Cited

U.S. PATENT DOCUMENTS

| | | | |
|---|---|---|---|
| 5,103,609 A * | 4/1992 | Thoreson et al. | 52/232 |
| 5,887,396 A * | 3/1999 | Thoreson | 52/232 |
| 6,029,412 A * | 2/2000 | Gohlke | 52/232 |
| 6,725,615 B1 * | 4/2004 | Porter | 52/232 |
| 7,082,730 B2 * | 8/2006 | Monden et al. | 52/232 |
| 8,336,832 B2 * | 12/2012 | Van Walraven et al. | 248/56 |
| 2004/0149390 A1 | 8/2004 | Monden et al. | |
| 2010/0242252 A1 * | 9/2010 | Foerg | 29/428 |

FOREIGN PATENT DOCUMENTS

| | | |
|---|---|---|
| DE | 102009001961 A1 | 10/2010 |
| EP | 0982522 A2 | 3/2000 |
| EP | 1422459 A1 | 5/2003 |

OTHER PUBLICATIONS

EP Communication, Aug. 27, 2012 in Application No. 12155495.0 (6 pages).

* cited by examiner

*Primary Examiner* — Bradley Duckworth

(74) *Attorney, Agent, or Firm* — McAndrews, Held & Malloy, Ltd.

(57) ABSTRACT

One or more embodiments of the present invention relate to a holder for a fire protection sleeve, having a mounting portion, a supporting portion and a holding portion, characterized in that the holding portion is provided with anchoring structure, which may positively interlock with the cover of a fire protection sleeve. One or more embodiments of the present invention also relate to an assembly of such a holder and a fire protection sleeve comprising a strip of an intumescent material, which is surrounded by a cover at least on one flat side and a longitudinal edge, characterized in that the anchoring structure may dig into the cover in the region of the longitudinal edge.

19 Claims, 5 Drawing Sheets

HOLDER FOR A FIRE PROTECTION SLEEVE

CROSS-REFERENCE TO RELATED APPLICATIONS

The present application claims priority to German Patent Application DE 10 2011 006 201.7, filed Mar. 28, 2011, and entitled "Halter Fur Eine Brandschutzmanschette" ("Holder For A Fire Protection Sleeve"), which is hereby incorporated by reference in its entirety.

BACKGROUND OF THE INVENTION

The present invention generally relates to a holder for a fire protection sleeve.

A fire protection sleeve is used in case of fire to seal off openings through which combustible or meltable pipes, cables or the like traverse walls, ceilings or floors of buildings. To achieve this, the fire protection sleeve is arranged around the pipes or cables so that in the event of a fire, expanding intumescent material seals off the opening as hermetically as possible. The fire protection sleeve may be arranged either on the outside of the opening, for example, on the wall through which the opening extends, or else even directly in the opening itself, and is of such a diameter that there is sufficient space available between the pipes or cables and the opening.

A holder of the type mentioned for a fire protection sleeve is known from DE 10 2009 001 961 A1, and includes a long strip of very thin intumescent material which is wrapped several times around the pipe or cable to be sealed off and is then fixed in place by using of several holders. In this case, the supporting portion is designed as a sheet metal clip. The supporting portion extends at a right angle to the mounting portion which fixes the holder, for example, to a wall or a ceiling, and supports the outer edge of the fire protection sleeve. The holding portion engages with the annular end face of the fire protection sleeve and presses the multiple layers on one another. A disadvantage of this arrangement is that a portion of the intumescent material may spread in the axial direction of the opening to be sealed, so that material is lost. This loss must, therefore, be compensated so that a larger amount of intumescent material must be provided.

A holder is known from DE 102 17 174 A1, which has a mounting portion and a supporting portion. The supporting portion extends perpendicularly to the mounting portion and abuts against the cylindrical outer wall of the fire protection sleeve. This is formed by a perforated plate, while the supporting portion has a plurality of pins that engage in openings in the perforated plate in order to fix the fire protection sleeve in position.

BRIEF SUMMARY OF THE INVENTION

A system and method for a fire protection sleeve is provided. The fire protection sleeve has a mounting portion, a supporting portion and a holding portion, characterized in that the holding portion is provided with anchoring structure, which may positively interlock with the cover of a fire protection sleeve. Additionally, an assembly is provided of such a holder and a fire protection sleeve comprising a strip of an intumescent material, which is surrounded by a cover at least on one flat side and a longitudinal edge, characterized in that the anchoring structure may dig into the cover in the region of the longitudinal edge.

BRIEF DESCRIPTION OF THE DRAWINGS

One or more embodiments of the invention may be described with reference to various embodiments that are illustrated in the accompanying drawings. In the drawings.

Figure 9:
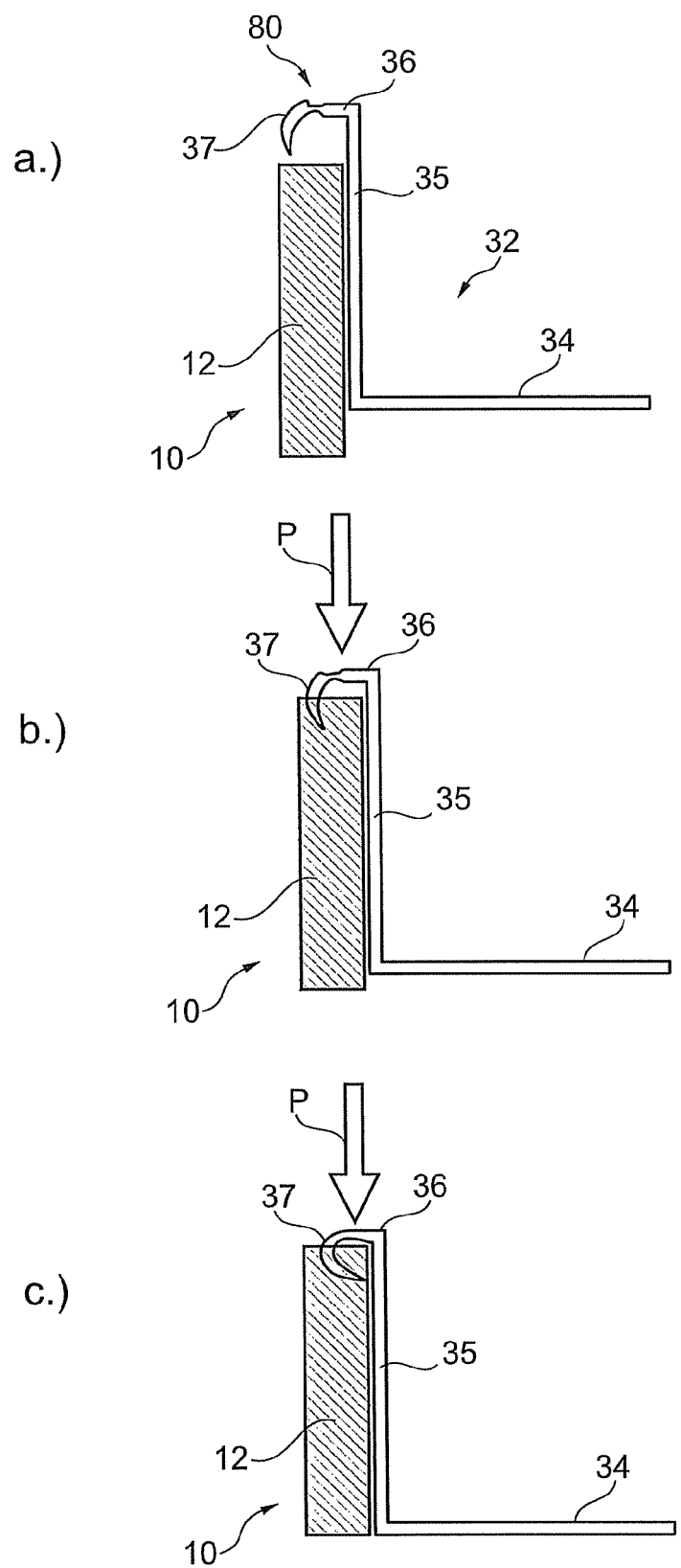
Figure 10:
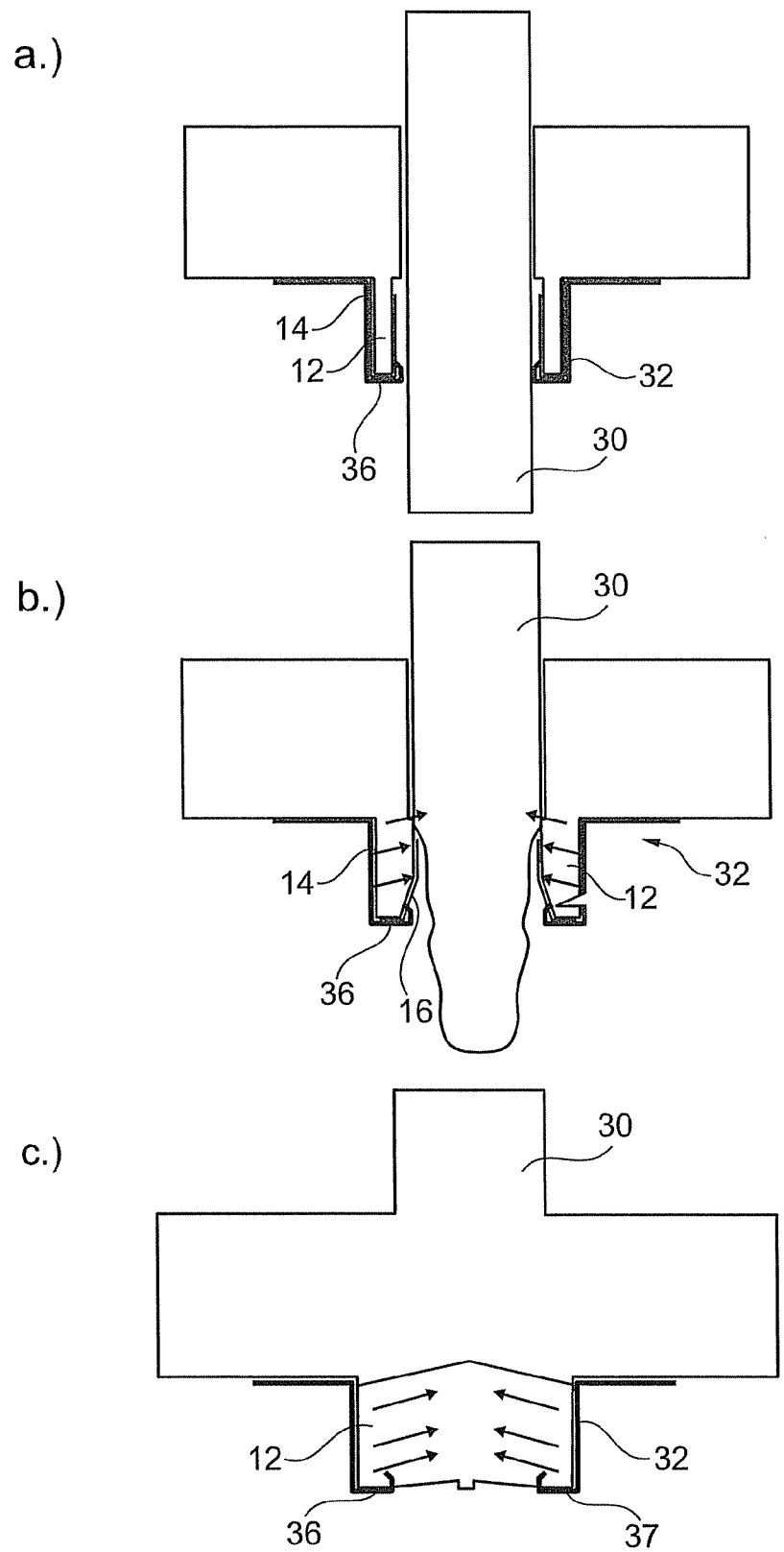

The FIGS. 9a to 9c show various steps during the assembly of a holder according to a fourth embodiment;

The FIGS. 10a to 10c show a wall opening in the initial state, at the beginning of a fire and in the state where the opening is sealed off by the fire protection sleeve.

DETAILED DESCRIPTION OF THE INVENTION

One or more embodiments of the present invention provide a holder which allows for a particularly efficient use of a fire protection sleeve.

To achieve this, one or more embodiments of the present invention provide a holder of the type mentioned above whereby the holding portion is provided with an anchoring structure which may positively interlock with a cover of a fire protection sleeve. This makes it possible to mount the fire protection sleeve with little effort so that the cover exerts a directional effect on the intumescent material when this expands. This may thus prevent the intumescent material from escaping in the axial direction and not being available to seal off the opening.

According to one embodiment of the invention, the holding portion is positioned at a right angle to the supporting portion while the anchoring structure extends approximately parallel to the supporting portion. In this embodiment, the supporting portion lies opposite the annular end face of the fire protection sleeve, so that it fixes the end face, thereby ensuring that the intumescent material expands substantially inwards in the radial direction.

According to an alternative embodiment, the holding portion is angled twice starting from the supporting portion and is so configured that, together with the supporting portion, it forms a receiving channel for an edge portion of the fire protection sleeve. In this embodiment, the holding portion engages the annular end face of the fire protection sleeve, so that the anchoring structure faces the supporting portion. Under the action of the swelling effect of the intumescent material, a particularly reliable anchoring of the cover of the fire protection sleeve in the holding portion is obtained in this embodiment.

According to one embodiment of the invention, it may be arranged that the anchoring structure extends at an angle smaller than 90° to the supporting portion towards the base of the receiving channel. This orientation of the anchoring structure makes it easier to move the holding portion towards the edge of the fire protection sleeve.

The anchoring structure may, in particular, be formed by at least one pin or a claw. These anchoring structure are particularly well suited to positively interlock with the cover of a fire protection sleeve. By the term "positively interlock," it is not necessarily to be understood that this means that the claw or pin penetrates the cover. It has been found that the anchoring structure ensures a positive interlocking anchorage because of the swelling effect even in the case of a very stable cover. When a cover of a material of lesser resistance is used, the claw or the mandrel penetrates the cover as well. However, it is not necessary that this is actually effected during assembly of the holder to the fire protection sleeve. This facilitates the possible dismantling of the holder. In the event of fire, the swelling pressure then presses the cover so strongly against the anchoring structure that the claw or the mandrel may be forced through the cover.

According to one embodiment, the claw is connected with the holding portion at a predetermined bending point. This makes it possible to so deform the claw during the assembly process that it digs deeply into the fire protection sleeve in order to provide a suitably reliable anchoring.

According to one embodiment of the invention, the supporting portion may be provided with at least one locking structure, such as a pin. The locking structure increases the supporting effect of the supporting portion on the outer surface of the cover and also serve as an anti-slip protection.

To achieve the above according to one or more of the embodiments of the invention, an assembly of a holder and a fire protection sleeve is also provided that comprises a strip of intumescent material surrounded by a cover on at least one flat side and a longitudinal edge, whereby the anchoring structure may dig into the cover in the region of the longitudinal edge. The resulting benefits are as indicated in the above explanations.

Figure 1:
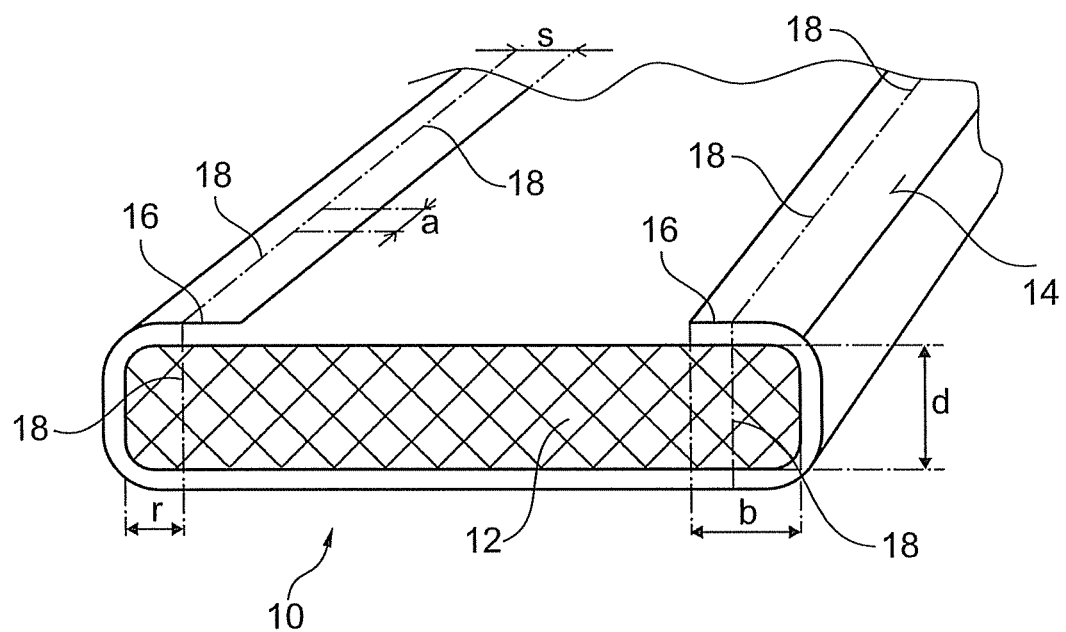
FIG. 1 is a perspective sectional view of a fire protection sleeve that may be used together with a holder according to one or more of the embodiments of the invention.

FIG. 1 shows a strip-shaped fire protection sleeve 10 that includes a strip 12 of intumescent material. The intumescent material is a conventional composition containing, for example, active substances such as exfoliated graphite or ammonium polyphosphates bound in polymer. In the illustrated embodiment, the intumescent strip 12 has a rectangular cross section with, for example, a width of 50 mm and a thickness of 5 mm.

A cover 14, including a fabric or a fleece, is arranged around the intumescent strip 12. The cover may contain threads of glass, stone, ceramic and/or metal. The cover 14 is resistant up to a temperature of at least 500° C. With regard to the desired strength, it has a basis weight of at least 100 g/m$^2$.

As shown in FIG. 1, the cover 14 extends around a flat side of the intumescent strip 12, then around the two narrow longitudinal edges up to the other flat side. In the embodiment shown in FIG. 1, the sheath 14 extends with two narrow envelope edges 16 on the flat side to fully cover the flat side (here: the underside). Each of the envelope edges 16 has a width b which is at least 50% of the thickness d of the intumescent strip. The intumescent strip 12 lies freely between the two envelope edges 16.

The intumescent strip 12 may be directly extruded onto the material of the cover 14, or it may be adhesively bonded thereto. It is also possible, in principle, for the intumescent strip 12 to hang loose on the cover 14 and then to envelop the edges. In any case, the intumescent strip 12 is connected to the casing 14 by fastening structure 18. These are formed by a seam in the embodiment shown in FIG. 1. For stability reasons, the stitches have a minimum distance r of 2 mm from the outer edge of the intumescent strip 12. The same minimum distance s is maintained from the free edge of the envelope edges 16. The distance a from each of the stitches may be between 2 and 25 mm.

Instead of the seam 18, metal staples may also be used where they are driven at suitable distances in the intumescent strip 12 to suitably fix the envelope edge 16.

Figure 2:
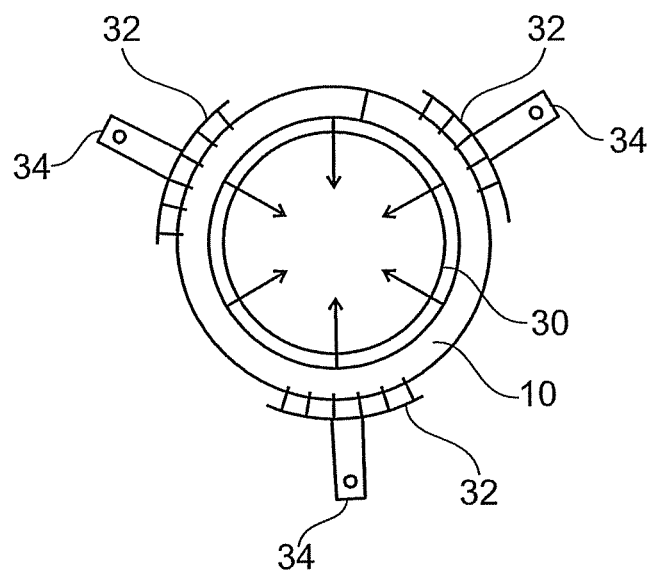
FIG. 2 is a schematic plan view of a fire protection sleeve assembled with a holder according to one or more of the embodiments of the invention.

FIG. 2 schematically shows the fire protection sleeve 10 mounted on a pipe 30. The fire protection sleeve 10 is placed around the outer circumference of the pipe 30 and is fixed there by a plurality of holders 32, which include sheet metal and where each has an attachment portion 34 with which they may be mounted on a wall, a floor or a ceiling, through which the pipe 30 passes. In the event of fire, the intumescent material expands due to the applied heat so that it seals off the opening, through which the pipe 30 is passed.

Figure 3:
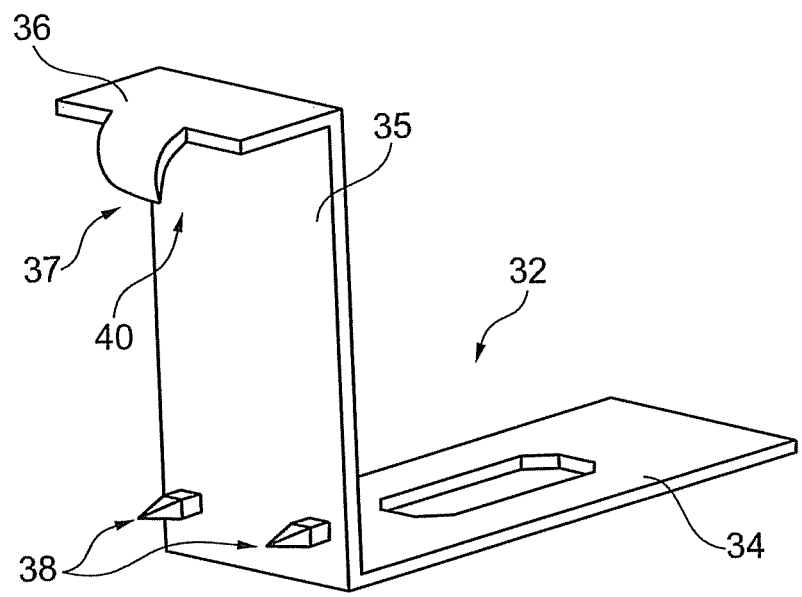
FIG. 3 is a perspective view of a holder according to a first embodiment of the invention.

FIG. 3 shows a first embodiment of the holder 32. It includes sheet metal and has a supporting portion 35 which extends approximately perpendicularly to the mounting portion 34. A holding portion 36 is arranged at the end remote from the fastening portion 34 of the supporting portion 35, whereby the former extends in turn at a right angle to the supporting portion 35, and thus approximately parallel to the mounting portion 34. The holder 32 thus has a stepped shape. Anchoring structure 37 is arranged at the free end facing away from the supporting portion 35 of the holding portion 36, whereby the former is in the shape of a curved claw tapered downwards, i.e. towards the attachment portion 34. The anchoring structure 37, holding portion 36, supporting portion 35 and mounting portion 34 are formed as one piece, in particular as a sheet metal strip which may be punched and bent into the desired shape.

The holding portion 36, together with the adjacent areas of the supporting portion 35 and the anchoring structure 37, forms a channel 40 in which an edge of the fire protection sleeve 10 may be received, as will be explained later. The width of the channel 40 between the tip of the claw of the anchoring structure 37 and the supporting portion 35 corresponds at least to the thickness of the fire protection sleeve.

Two pins 38 are arranged on the supporting portion 35 in the vicinity of the mounting portion 34, to form a locking structure with respect to which the anchoring structure 37 are also arranged.

Figure 4:
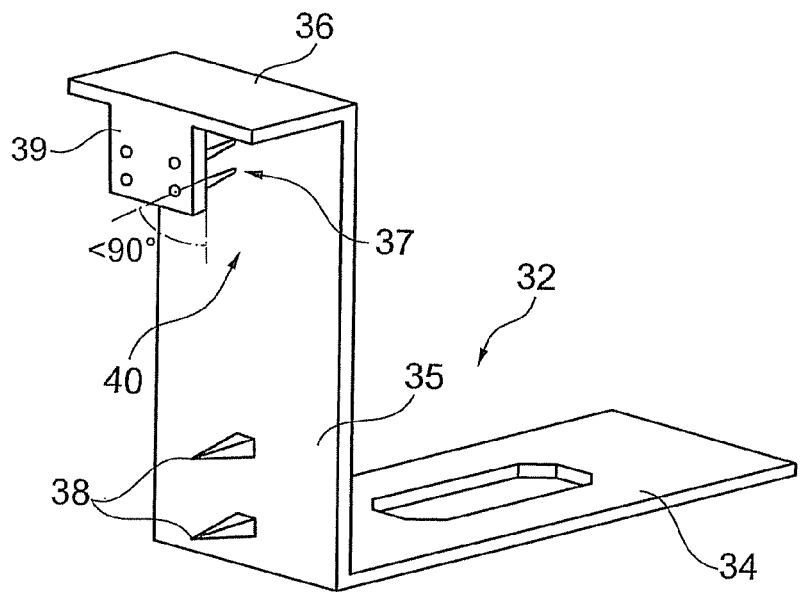
FIG. 4 is a perspective view of a holder according to a second embodiment of the invention.

FIG. 4 shows a holder according to a second embodiment. The difference from the first embodiment is essentially in the design of the anchoring structure 37. Here they are formed by four pins, which are arranged on a holding plate 39. The pins do not extend in parallel to the holding portion 36 and thus perpendicularly to the supporting portion 35, but are tilted slightly upwards towards the holding portion 36. This facilitates the assembly of the holder 32 with the fire protection sleeve 10.

Figure 5:
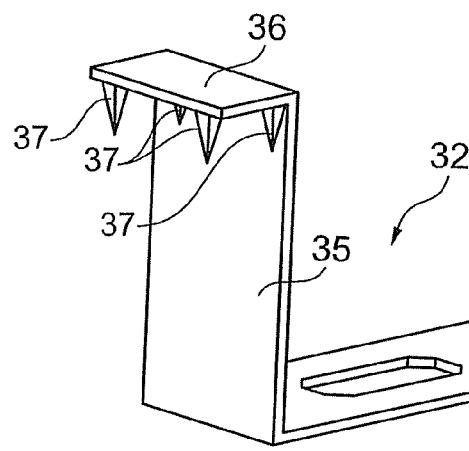
FIG. 5 is a perspective view of a holder according to a third embodiment of the invention.

FIG. 5 shows a holder according to a third embodiment. The difference from the first and second embodiments is that the holding portion 36 cannot engage around the edge of the fire protection sleeve, but only faces the latter. The anchoring structure 37 are formed by a plurality of pins, which extend essentially in parallel to the supporting portion 35 towards the mounting portion 34.

Figure 6:
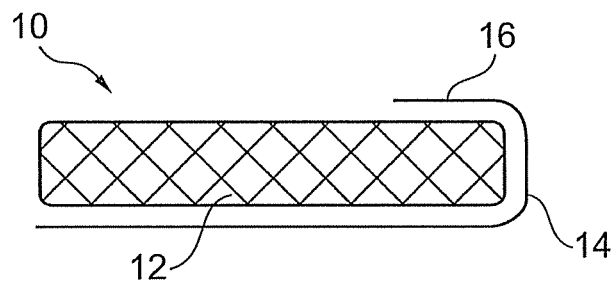
FIG. 6 is a schematic sectional view of an embodiment of a fire protection sleeve that may be used together with a holder according to the invention.

FIG. 6 shows an embodiment of a fire protection sleeve 10 that interacts particularly well with the holder 32. Here, the cover edge 16 of the cover 14 extends along a flat side of the intumescent strip 12 and around one of the longitudinal edges to the other flat side. The cover 14 may be bonded with the intumescent strip 12 over substantially its entire surface, for example by an adhesive layer, or it may be so connected that the intumescent material is extruded onto the cover 14. Mechanical attachment by seams, staples or rivets may be omitted.

Figure 7:
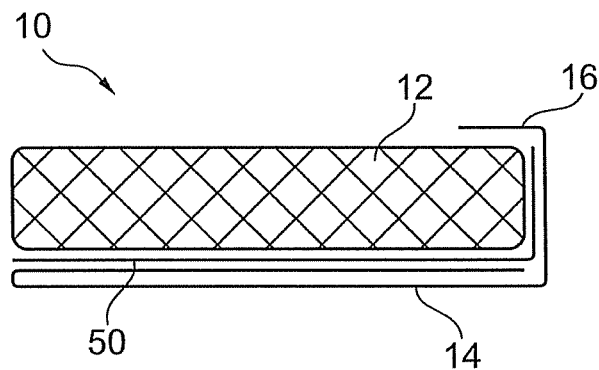
FIG. 7 is a schematic sectional view of another variation of a fire protection sleeve.

FIG. 7 shows a further embodiment of a fire protection sleeve, which is particularly suitable for the holder of FIGS. 3 to 5. The difference with respect to the embodiment shown in FIG. 6 is that the fabric layer of the cover 14 is arranged as a double layer on the lower flat side of the intumescent strip 12, whereby the free edge portion of the cover 14 is folded inwards, so that it cannot fray. A layer of adhesive 50 is also indicated in FIG. 7 to serve for full-area adhesive bonding of the cover 14 with the intumescent strip 12.

Figure 8:
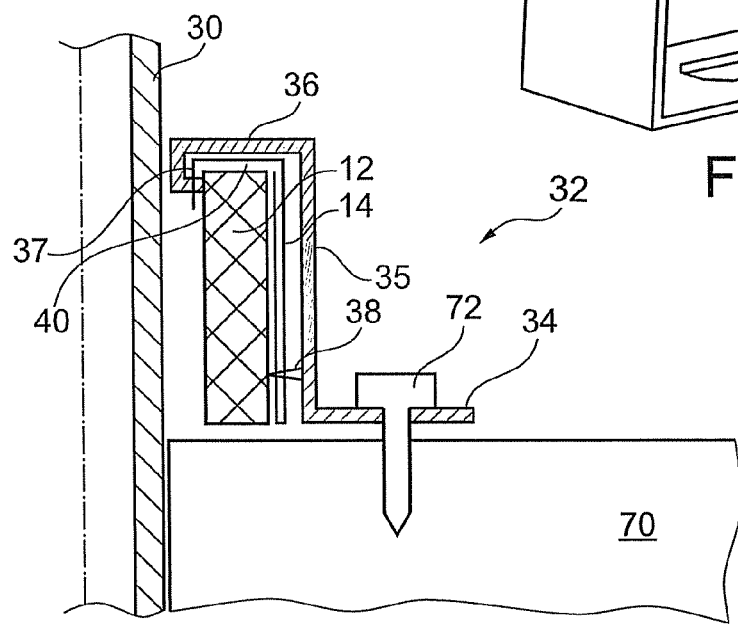
FIG. 8 is a schematic sectional view of the holder of FIG. 3 together with the fire protection sleeve of FIG. 7.

The holder 32 according to the first embodiment is shown in FIG. 8, whereby a fire protection sleeve 10 of the embodiment shown in FIG. 7 is mounted on a pipe 30. The holder 32 is attached to a base 70, through which the pipe 30 extends. A concrete bolt 72 is used to bolt the mounting portion 34 to the base 70. The supporting portion 35 supports the annular outer side of the fire protection sleeve 10, and the upper edge of the fire protection sleeve shown in FIG. 8 lies with the annular end face within the channel 40 which is formed by the holding portion 36 together with the adjacent portion of the supporting portion 35 and the anchoring structure 37. FIGS. 9a to 9c schematically show the mounting of a variant of the holder 32 shown in FIG. 3 with a fire protection sleeve 10. The difference from the embodiment shown in FIG. 3 is that the anchoring structure 37 is not located on the inside of the fire protection sleeve, but in the region of the annular end face. Furthermore, the claw, which forms the anchoring structure, is connected with the retaining portion 36 by using a predetermined bending point 80. During mounting, first the bracket 32 is arranged on the fire protection sleeve 10 (see FIG. 9a). Then, the anchoring structure 37 is pressed downwards (see arrow P in FIG. 9b), so that the anchoring structure digs into the end face of the fire protection sleeve 10. In the fully mounted state (see FIG. 9c), the holding portion 36 lies on the front side of the fire protection sleeve 10 while the anchoring structure 37 is buried deep in the material of the fire protection sleeve. In this case, the anchoring structure 37 perforates the cover 14.

The interaction of the inventive holder 32 according to one or more embodiments of the invention with a fire protection sleeve is now described in reference to the FIGS. 10a to 10c.

In FIG. 10a, the holder 32 may be seen that holds the fire protection sleeve 10 annularly around the pipe 30 in the area of the opening by a cover. In this state, the anchoring structures 37 at each holder 32 do not necessarily have to perforate the cover 14 of the fire protection sleeve 10. It is sufficient if the anchoring structures 37 lie close to the cover.

In FIG. 10b, the fire protection sleeve is shown a short time after the start of the heat effect caused by a fire. The pipe 30 begins to melt, while the intumescent strip 12 expands (see arrows). Because of the swelling pressure exerted in all directions of the intumescent material, the cover 14 of the fire protection sleeve is pressed against the anchoring structure 37 of the holder 32, so that there is positive interlocking. It may already happen at this point in time that the tip of the claws or pins digs so far into the fabric of the cover that it may no longer slip. Depending on the strength of the cover and the swelling pressure exerted, the cover 14 may also be pressed onto the pins or claws so that they perforate the cover. In any event, the terminal edge 16 of the jacket 14 of the fire protection sleeve 10 is so firmly anchored to the holders 32 that an annular supporting zone is formed, which ensures that the intumescent material expands substantially in the radial direction and not in the axial direction downwards in accordance with FIG. 10b. The inner area of the cover 14 thus does not influence the swelling because it is very short.

In FIG. 10c, a state is shown, as it exists after full expansion of the intumescent material. The annular fire protection sleeve formed in the initial state is expanded to such an extent that a solid plug is formed which seals off the opening of the pipe 30 and is securely held in place by the holders 32.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A holder for attaching a fire protection sleeve to a structure, the holder comprising:
 a support portion having first and second ends;
 a mounting portion extending from the first end of the support portion, the mounting portion being configured to be secured to the structure;
 a holding portion extending from the second end of the support portion opposite the mounting portion, the holding portion comprising an anchoring structure configured to interlock with the cover of the fire protection sleeve when an edge portion of the fire protection sleeve is received by a receiving channel formed by the holding portion;
 wherein the holding portion is angled twice starting from the support portion so that, together with the support portion, the receiving channel is formed for the edge portion of the fire protection sleeve.

2. A holder according to claim 1, wherein the holding portion is at a right angle to the support portion, while the anchoring structure extend approximately parallel to the support portion.

3. A holder according to claim 1, wherein the anchoring structure faces the said support portion.

4. A holder according to claim 1, wherein the anchoring structure extends at an angle of less than 90° with respect to the support portion and towards the base of the receiving channel.

5. A holder according to claim 1, wherein the anchoring structure comprises least one pin.

6. A holder according to claim 1, wherein the anchoring structure comprises at least one claw.

7. A holder according to claim 6, wherein the at least one claw is connected with the holding portion by a predetermined bending point.

8. A holder according claim 1, wherein the support portion is provided with at least one locking structure.

9. A holder according to claim 8 wherein the locking structure is formed by at least one pin.

10. A holder according to claim 1, wherein the anchoring structure and the receiving channel are further configured to permit removal of the fire protection sleeve from the receiving channel.

11. The holder according to claim 1, wherein the anchoring structure comprises one or more projections that are configured to interlock with the cover of the fire protection sleeve without penetrating into the cover.

12. A holder for attaching a fire protection sleeve to a structure, the holder comprising:
 a support portion having first and second ends;
 a mounting portion extending from the first end support in a first direction that is generally perpendicular to the support portion, the mounting portion being configured to be secured to the structure;

a holding portion extending from the second end of the support portion in a second direction that is opposite the first direction and generally perpendicular to the support portion;

a claw extending from the holding portion in a direction towards the first end of the support portion, wherein the claw is configured to interlock with the fire protection sleeve when an edge portion of the fire protection sleeve is received by a channel of the holding portion.

13. A holder according to claim 12, wherein the claw is connected to the holding portion by a bending point that permits the claw to be bent relative to the holding portion to positively interlock the claw with the fire protection sleeve during assembly.

14. The holder according to claim 12, wherein the claw is further configured to interlock with the cover of the fire protection sleeve without penetrating into the cover.

15. An assembly for installation adjacent to an opening in a building structure, comprising:

a fire protection sleeve comprising a strip of an intumescent material and a cover having a predetermined resistance, wherein the intumescent strip has a predetermined thickness defined by two opposed faces and two longitudinal edges extending between the two opposed faces; and a holder comprising:

a support portion having first and second ends;

a mounting portion extending from the first end of the support portion, wherein the mounting portion is configured to be secured to the building structure adjacent the opening; and a holding portion extending from the second end of the support portion opposite the mounting portion, wherein the holding portion comprises a channel that mates with a longitudinal edge of the fire protection sleeve and one or more projections that are configured to interlock with the cover of the fire protection sleeve.

16. A holder according to claim 15, wherein the one or more projections comprise a curved claw that extends from the holding portion in a direction towards the first end of the support portion.

17. A holder portion according to claim 16, wherein the holding portion comprises a first end adjacent the second end of the support portion and a second end opposite the first end, and wherein the curved claw extends from the second end of the holding portion.

18. The assembly of claim 15, wherein the cover extends over one of the opposed faces, at least one of the longitudinal edges, and a portion of the other opposed face to leave a portion of the intumescent strip exposed to the opening.

19. The assembly of claim 15, wherein the one or more projections are further configured to interlock with the cover of the fire protection sleeve without penetrating into the cover.

* * * * *